United States Patent [19]
Sturm

[11] Patent Number: 5,991,602
[45] Date of Patent: *Nov. 23, 1999

[54] METHOD OF AND SYSTEM FOR COMMUNICATION BETWEEN POINTS ALONG A FLUID FLOW

[75] Inventor: John A. Sturm, St. Louis, Mo.

[73] Assignee: LaBarge, Inc., St Louis, Mo.

[21] Appl. No.: 08/764,668

[22] Filed: Dec. 11, 1996

[51] Int. Cl.[6] .................................................. H04B 1/00
[52] U.S. Cl. ............................................. 455/40; 455/899
[58] Field of Search .......................... 455/40; 340/853.1, 340/853.2, 853.3, 854.3, 854.6, 854.8, 825.54; 367/81, 82, 83; 406/49, 189

[56] References Cited

U.S. PATENT DOCUMENTS

| | | | |
|---|---|---|---|
| 4,000,927 | 1/1977 | Sakamoto et al. | 406/189 |
| 4,724,434 | 2/1988 | Hanson et al. | |
| 5,448,110 | 9/1995 | Tuttle et al. | 340/825.54 |
| 5,485,148 | 1/1996 | Tseng | 340/825.54 |
| 5,675,251 | 10/1997 | MacLean et al. | 324/220 |

FOREIGN PATENT DOCUMENTS

WO84/01439  4/1984  WIPO.

OTHER PUBLICATIONS

Hayhrst, J.D., "The Pneumatic Post of Paris," The France and Colonies Philatelic Society of Great Britain, 1974.
Austrian Patent Office Search Report, Apr. 4, 1999, 48 pages.

*Primary Examiner*—Reinhard J. Eisenzopf
*Assistant Examiner*—Makoto Aoki
*Attorney, Agent, or Firm*—Armstrong Teasdale LLP

[57] ABSTRACT

A method of communicating data between points along a fluid flow includes providing a plurality of remotely writable and readable data storage units capable of flowing in the fluid flow; remotely writing data to the data storage units as they pass a first point in the fluid flow; and remotely reading data from the data storage units as they pass a second point in the fluid flow downstream of the first point. The system of the present invention includes a plurality of remotely writable and readable data storage units capable of flowing in the fluid flow; a data writer at the first point for remotely writing data to the data carriers as they pass the first point in the fluid flow; and a data reader at the second point for remotely reading data from the data carriers as they pass the second point in the fluid flow.

1 Claim, 2 Drawing Sheets

METHOD OF AND SYSTEM FOR COMMUNICATION BETWEEN POINTS ALONG A FLUID FLOW

FIELD OF THE INVENTION

This invention relates to a method of, and apparatus for, communicating between points along a fluid flow, and in particular for communication between points along a fluid flow in oil and gas drilling and pipelines.

BACKGROUND OF THE INVENTION

There are a number of instances where conventional communication methods, such as via an electric wire or optical fiber, or directly through RF (radio frequency) transmission, are not practical. One specific example is communication between a downhole drilling tool assembly and the rig at the surface. It is not always practical to have an optical fiber or electric wire in the well, and RF signals have difficulty traveling sufficient distances through the earth to permit communication. Recently, communication between the downhole equipment of a deep drilling tool and the surface has been effected by sending mechanical pulses through the drilling fluid in the well. One such system has been developed by Baker Hughes Incorporated under the name EDGE. While such systems do permit communication, the communication rates are extremely slow. Moreover, in some cases drilling operations may have to be interrupted to permit communications. What is needed is some alternative to conventional communication methods that provides reliable communication at far greater data transfer rates.

SUMMARY OF THE INVENTION

The present invention relates to a method of communication between two or more points which utilizes a fluid flow between the points. Such a method thus has application to communication in wells, where the circulating drilling mud or fluid provides a communication pathway during drilling. Such a method also has application in other instances where a fluid flow exists, or can be established, between two or more points, such as communication in a pipeline system.

Generally, the method of the present invention comprises the steps of providing a plurality of remotely readable, erasable and writable data carriers capable of flowing in the fluid flow between two points; remotely writing data to the data carriers at the first point, and remotely reading the data from the data carriers as they pass the second point. This method allows data to be communicated to wherever a fluid flow capable of conveying the data carriers exists or can be established. By selecting the capacity of the data carriers and the number of data carriers, a relatively large amount of data can be communicated, at a rate determined by the fluid flow rate.

DETAILED DESCRIPTION OF THE PREFERRED EMBODIMENT

Figure 1:
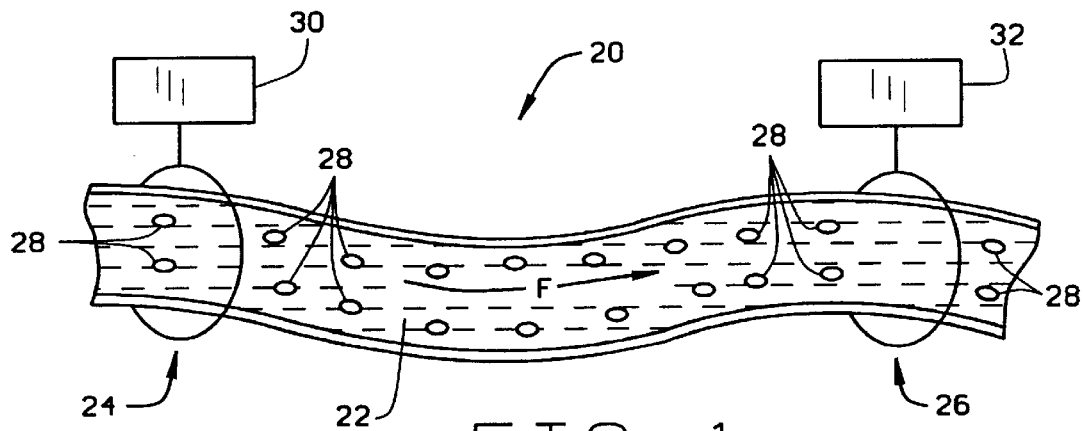
FIG. 1 is a schematic view of a communication system constructed according to the principles of this invention, for implementing the method of this invention.

A system 20 for communicating data between two points in accordance with this invention is shown schematically in FIG. 1. The system 20 comprises a fluid flow 22, which may be a flow through a conduit, pipe, or duct, or a flow that is unrestrained. The system is adapted to permit communication between two points 24 and 26 along the fluid flow 22. The system includes a plurality of data carriers 28. The data carriers 28 are data storage devices that can be remotely written to and read. The data carriers 28 preferably comprise a circuit including a data chip and an antenna encapsulated to protect circuit from the fluid flow 22. The data carriers 28 preferably have the size, weight, and shape to flow smoothly in the fluid flow 22.

Suitable data carriers could be similar in construction to commercially available non-contact identification transponders, for example the AVID identity tags or AVID industrial RF ID transponders available from Avid, 3179 Hamner Avenue, Norco, Calif. 91760. These identity tags and transponders comprise an integrated circuit and coil capacitor hermetically sealed in biocompatible glass. The AVID2023 identify tag is only 0.45 in×0.08 in (12 mm×2.1 mm), weighs 0.0021 oz. (0.06 gm), and can carry 96 bits. The tag has no internal power source, and is instead powered by RF energy from the reader, which generates a 125 KHz radio signal. When the tag is within the electromagnetic field of the reader, the tag transmits its encoded data to the reader, where it can be decoded and stored. Typical read distances range from 4.125 inches (10 cm) to about 10.25 inches (26 cm), and read times are less than 40 msec.

Information useful to the design of suitable data carriers can be found in Kaiser and Steinhagen, *A Low-Power Transponder IC for High-Performance Identification Systems*, 30 IEEE Journal of Solid-State Circuits, Vol. 30, No. 3, page 306 (March 1995), incorporated herein by reference, and in Pobanz and Itoh, *A Microwave Noncontact Identification Transponder Using Subharmonic Interrogation*, 43 IEEE Transactions on Microwave Theory and Techniques, Vol. 43, No. 7, page 1673 (July 1995), incorporated herein by reference.

The system 20 also includes a remote writing device 30 at the first point 24 for remotely writing to the data carriers 28, and a remote reading device 32 at the second point 26 for remotely reading the data carriers 28 as they pass the second point in the stream 22.

The data written on the data carriers 28 preferably includes ordering or sequencing data as well as information data, so that the information data can be properly reassembled. Because spacing between the data carriers 28 can vary, and in fact the data carriers can arrive at the second point out of sequence, the ordering or sequencing information allows the data to be reassembled correctly. The data is preferably redundantly written on at least two data carriers 28, to reduce the risk of lost data if some data carriers 28 become lost or damaged.

Figure 2:
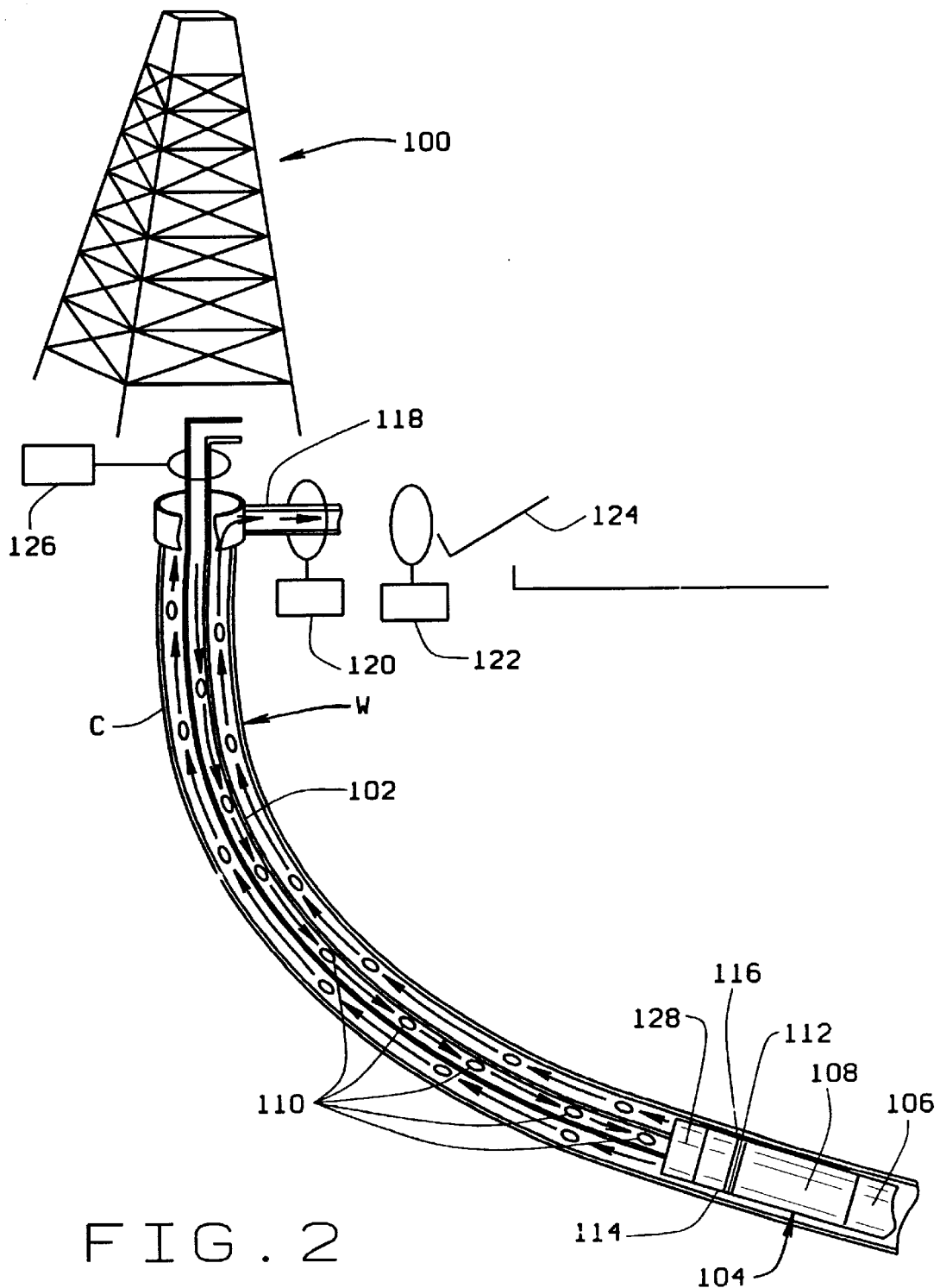
FIG. 2 is a schematic view of a well drilling system constructed according to the principles of this invention, that implements the method of this invention.

FIG. 2 is a schematic view of a drilling rig incorporating the communications system of the present invention. The drilling rig includes a derrick 100 with a drilling string 102 extending to the drilling tool assembly 104 down the wellbore W. The drilling tool assembly includes a drill bit 106 and instrumentation 108, which can include inertial navigation position sensors, sensors for detecting the type and condition of the rock, and even cameras. The wellbore W may be partially encased by a casing C. Drilling mud or fluid is circulated down the drilling string 102 and returns in the wellbore in the space surrounding the drilling string 102. The drilling fluid serves to help clear debris from the drill bit, lubricate the drill bit, cool the drilling assembly, and contain downhole pressure against "blowouts".

In accordance with the principles of the present invention, a plurality of data carriers 110 are circulated in the drilling fluid. The data carriers are preferably constructed as described above with respect to data carriers 28. The inventor believes that a generally spherical configuration with a diameter of less than 0.5 inch (1.25 cm) is preferred. The drilling assembly 104 includes a filter 112 for trapping the data carriers 110 that flow down through the drilling string 102, to prevent the data carriers from being carried by the drilling fluid to the drill bit 106, where the data carriers could be destroyed. The drilling assembly also includes a data writer 114 for remotely writing to the data carriers that flow in the drilling fluid down the drilling string 102 to the drilling assembly 104. The data writer 114 can, for example, write data accumulated by the sensors 108 to the data carriers 110. The process of writing data may clear the memory of the data carrier, or a separate eraser 116 can be provided to clear previously recorded data. The data carriers 110 then flow with the drilling fluid back up the wellbore in the space surrounding the drilling string 102. At the top of the well the drilling fluid is drawn off in a conduit 118. A data reader 120 can be provided to read the data from the data carriers 110, and a data eraser 122 can be provided to erase the data carriers as they flow in the drilling fluid through the conduit 118. A separator or shaker table 124 can collect the data carriers 110 from the drilling fluid (and separate them from the rock chips carried in the drilling fluid) for reuse. The drilling rig 100 is preferably configured for two way communication so that in addition to permitting information about the underground conditions to be communicated to the surface, instructions from the surface can be communicated to the drilling tool assembly 104. A data writer 126 can be provided at the top of the well W for writing data to data carriers 110 either before the carriers are introduced into the drilling fluid or after the data carriers are introduced into the drilling fluid. The drilling assembly 104 is then also provided with a data reader 128 to read the data on the data carriers 110 as they reach the drilling tool assembly 104 in the drilling string 102.

Data collected by the sensors 108 in the drilling assembly 104, for example physical measurements such as resistivity of the rock surrounding the drilling assembly, can be written to the data carriers 110 by the data writer 114. The data is preferably written redundantly to a plurality of carriers, so that if some of the carriers are lost or destroyed, data is not lost. Instead of redundantly writing data, or in addition to redundantly writing data, where two way communication is provided, data can simply be stored until confirmation is received that data was received at the other point, and if confirmation is not received within a certain period of time, the data can be retransmitted. For example, the drilling assembly can store data collected about the drilling activity and periodically resend the information until confirmation is recorded that the data has been received. Similarly instructions to the drilling assembly can be written by data writer 126 before the data carriers 110 travel down the drilling string 102 to the drilling tool assembly 104. The drilling tool assembly 104 can read the instructions and respond. Moreover, after reading the instructions on the data carriers, the drilling assembly can write to the data carriers before they return to the surface. This data can include confirmation of the receipt and/or execution of the instructions. The data is also preferably written with ordering information to facilitate its reassembly in the proper order.

Depending upon the flow rate of drilling fluid, it is estimated that the data carriers can travel from the surface to the drilling head in as little as a few minutes. Depending upon the capacity of the storage devices, and the number of pellets used, data transfer rates can easily be increased tenfold over current technology. For example, in a drilling rig with a drilling string having an internal diameter of 2 inches, if drilling fluid is circulated at a rate of a few hundred gallons per minute, the total travel time to the bottom of a 10,000 foot well would be less than about ten minutes. Total travel time from the bottom of the well back to the top might be slightly longer, because the cross sectional area of the space outside the drilling string is generally greater than the interior of the drilling string.

Figure 3:
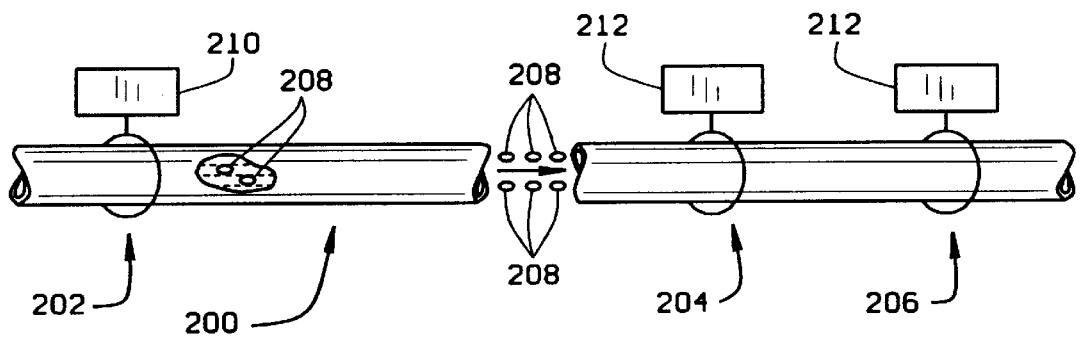
FIG. 3 is a schematic view of a pipeline system constructed according to the principles of this invention, that implements the method of this invention.

A pipeline constructed according to the principles of this invention is indicated generally as 200 in FIG. 3. The pipeline 200 is adapted to conduct a fluid flow between a point 202 first and second and third points 204 and 206, respectively. In accordance with this invention a plurality of data carriers 208 are introduced into the flow in the pipeline. As the data carriers 208 pass the first point 202, a data writer 210 can write data to the data carriers. This data can include data about the fluid passing in the pipe. For example in a petroleum pipeline used to transport a plurality of different types of petroleum products, the data carriers 208 can carry information about the grade and type of product being transported, or the ownership of the product. The data written on the carriers passing in the fluid can be read by one or more data readers 212 at the second point 204 or the third point 206 or elsewhere along the pipeline.

Figure 4:
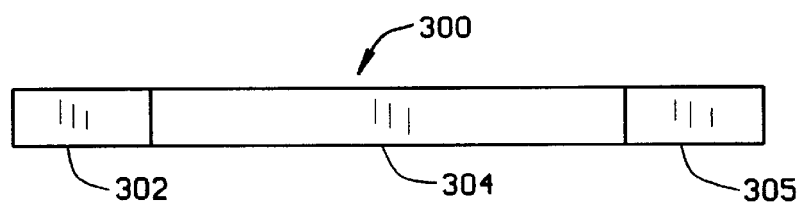
FIG. 4 is a schematic view of a possible data structure for the data carriers.

A sample data structure 300 for the data carriers is shown in FIG. 4. The data preferably includes ordering information 302, data 304, and error checking data 305.

OPERATION

In operation, during drilling using the drilling apparatus shown schematically in FIG. 2, a plurality of data carriers 110 are introduced into the drilling fluid or mud as it is enters the drilling string 102. The data carriers pass through the drilling string 102 where they are trapped by the filter 112, and are diverted to the outside of the drill string where they begin their return to the surface. The data carriers 110 pass the eraser 116 and the data writer 114, where data accumulated from the sensors 108 is written to the data carriers. The carriers then pass in the space in the well outside of drilling string 102, and out the conduit 118. The data carriers move in the conduit 118 past the data reader 120 where the data written to the data carriers is read. The data carriers move in the conduct 118 past the data eraser 122 where the data written to the data carriers is erased. This provides security and ensures that the data carriers are ready to be reused. The data carriers are recovered in the shaker table which simultaneously separates the data carriers from the drilling fluid and from the rock chips resulting from the drilling.

The data carriers 110 can be reintroduced into the drilling fluid and introduced into the well, and pass the data writer 126 where data, for example instructions for the drilling tool assembly, is written to the carriers. The data carriers 110 travel down the drilling string 102 to the data reader 128 where the data is read and can be processed by the drilling tool assembly.

In the pipeline system shown in FIG. 3, a plurality of data carriers 208 are introduced into the flow, and as the data carriers pass the first point 202, the data writer 210 writes data to the data carriers, for example data about the identity of the fluid in the flow, or the ownership or destination of the fluid in the flow. As the data carriers 208 pass points 204 and 206, the data readers read the data so that it can be processed and used locally.

Thus the apparatus and method of the present invention permit data to be communicated in a preexisting fluid path, or a fluid path created specifically for purposes of communication. The communication is secure and reliable, and the apparatus and method permit communication even where conventional methods of communication are unsatisfactory.

What is claimed is:

1. A system for communicating data along a fluid flow, the system comprising:

a plurality of remotely writable and readable electronic data storage units capable of flowing in a fluid flow;

a data writer at a first point along the fluid flow for remotely writing data to the electronic data storage units as they pass said first point in the fluid flow;

a data reader at a second point along the fluid flow for remotely reading data from the electronic data storage units as they pass said second point in the fluid flow, said second point separated by a distance from said first point; and a plurality of data sensors coupled to said data writer, said plurality of data sensors configured to accumulate data for writing to said plurality of electronic data storage units.

* * * * *